(12) United States Patent
Weiss et al.

(10) Patent No.: US 9,160,110 B2
(45) Date of Patent: Oct. 13, 2015

(54) FLEXIBLE ELECTRICAL POWER CONNECTION

(71) Applicants: Bruce W. Weiss, Milwaukee, WI (US); Robert M. Michalski, West Bend, WI (US); Jeremy Keegan, Kewaskum, WI (US); Robert Allen Savatski, Port Washington, WI (US)

(72) Inventors: Bruce W. Weiss, Milwaukee, WI (US); Robert M. Michalski, West Bend, WI (US); Jeremy Keegan, Kewaskum, WI (US); Robert Allen Savatski, Port Washington, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 92 days.

(21) Appl. No.: 14/073,647

(22) Filed: Nov. 6, 2013

(65) Prior Publication Data

US 2015/0124377 A1  May 7, 2015

(51) Int. Cl.
| | |
|---|---|
| *H01R 13/631* | (2006.01) |
| *H01H 33/02* | (2006.01) |
| *H01R 13/53* | (2006.01) |
| *H02B 11/04* | (2006.01) |
| *H02M 7/00* | (2006.01) |

(52) U.S. Cl.
CPC ......... *H01R 13/6315* (2013.01); *H01H 33/025* (2013.01); *H01R 13/53* (2013.01); *H02B 11/04* (2013.01); *H02M 7/003* (2013.01)

(58) Field of Classification Search
USPC ................... 439/251, 248, 246, 851
See application file for complete search history.

(56) References Cited

U.S. PATENT DOCUMENTS

| | | | | |
|---|---|---|---|---|
| 4,423,917 | A  * | 1/1984  | Scheingold et al. | 439/249 |
| 4,813,881 | A  * | 3/1989  | Kirby | 439/74 |
| 6,139,347 | A  * | 10/2000 | Nebon et al. | 439/251 |
| 6,629,853 | B2 * | 10/2003 | Whiteman, Jr. | 439/246 |
| 6,790,046 | B2 * | 9/2004  | Haffenden et al. | 439/6 |
| 7,168,990 | B2 * | 1/2007  | Suzuki et al. | 439/636 |
| 7,641,500 | B2 * | 1/2010  | Stoner et al. | 439/357 |
| 7,762,857 | B2 * | 7/2010  | Ngo et al. | 439/856 |
| 7,878,830 | B2 * | 2/2011  | Duesterhoeft et al. | 439/248 |
| 8,062,051 | B2 * | 11/2011 | Ngo | 439/352 |
| 8,197,289 | B1 * | 6/2012  | Faber et al. | 439/819 |
| 8,366,451 | B2 * | 2/2013  | Littek et al. | 439/12 |
| 2009/0047814 | A1 * | 2/2009 | Daamen | 439/251 |
| 2010/0221941 | A1 * | 9/2010 | Andersen et al. | 439/251 |

OTHER PUBLICATIONS

Hardware Manual, ACS800-104 Inverter Modules, © 2003 ABB Oy.

\* cited by examiner

*Primary Examiner* — Alexander Gilman
(74) *Attorney, Agent, or Firm* — Fay Sharpe LLP

(57) ABSTRACT

A motor drive unit including an enclosure, a bus bar supported by the enclosure, at least one modular power unit, and a flexible connector for electrically coupling the modular power unit with the bus bar. The flexible connector includes mating male and female connector portions each mounted to a respective one of the bus bar and the modular power unit, the connector portion mounted to the modular power unit being supported by a housing mounted to the modular power unit for movement relative thereto.

17 Claims, 9 Drawing Sheets

FLEXIBLE ELECTRICAL POWER CONNECTION

BACKGROUND

The present exemplary embodiment relates to power systems. It finds particular application in conjunction with connectors for power systems, and will be described with particular reference thereto.

Power systems convert input electrical power from one form to another for driving a load. Motor drive type power converters are used in a variety of applications to provide electrical power to drive a motor load. For instance, motor drives may be needed to power low voltage as well as high-voltage motors, and multiple motor drives may be connected in parallel to accommodate higher load requirements. In a typical situation, AC input power is initially converted by an active or passive rectifier circuit to provide a DC bus voltage for use by one or more output inverters to create variable frequency, variable amplitude AC output power to drive an induction motor load. Ultimately, the motor drive outputs the waveforms necessary to drive a motor to a desired speed, position, torque, etc.

In general, the variability in the requirements of a given motor drive application often require custom designing and configuration of system components and their interconnections including the necessary power converters and filter components which are then connected together to form a power system. In order to accommodate a wide variety of power system specifications while minimizing system cost, it is therefore desirable to provide modular components that can be used in building two or more different types and forms of systems.

In systems using modular components, electrical connections between the components and/or an enclosure in which the components are located need to be secure to ensure a robust connection. In the past, strict manufacturing tolerances were implemented to ensure proper alignment of the electrical connectors between components and/or the enclosure leading to increased expense. This approach seeks to minimize any misalignment of the connector components during assembly, and accommodates misalignment that may exist from manufacturing tolerances or from other sources.

One approach to accommodating a small amount of misalignment between mating electrical connectors is to provide a spring loaded connector component. The spring loaded connector component can be deflected a small amount to accommodate some misalignment between connector components. This solution accommodates limited number and amount of axis misalignment.

BRIEF DESCRIPTION

The present disclosure includes a flexible electrical connector for connecting components of a motor drive. The connector accommodates misalignment in multiple axes between mating male and female connector parts. In one embodiment, a first connector part is supported by a housing that is movably mounted to an associated component. During assembly of the first connector part to a mating second connector part, the housing can shift relative to the associated component to accommodate misalignment of the mating connector parts. In another aspect, a terminal (stab) is supported in a flexible manner within the housing such that the terminal can shift relative to the housing during assembly of the connector.

In accordance with one aspect, a motor drive unit comprises an enclosure, at least one modular power unit, and a flexible connector for electrically coupling the modular power unit with the bus bar. The flexible connector includes mating male and female connector portions each mounted to a respective one of the bus bar and the modular power unit, the connector portion mounted to the modular power unit being supported by a housing mounted to the modular power unit for movement relative thereto.

The housing can be secured to the modular power unit with at least one fastener, said at least one fastener can extend through an oversized mount hole in at least one of the housing or the modular power unit. The fastener can include a shoulder screw, and the mount hole can be elongate. The motor drive unit can further include a conductor stab supported in a socket of the housing of the connector portion of the modular power unit. The conductor stab can be supported for movement relative to the housing. A base portion of the conductor stab can be coupled to the housing by at least one pin extending through a hole in the base portion of the conductor stab, respective ends of the at least one pin being secured to the housing, whereby the conductor stab is pivotable and slideable about said at least one pin. The hole in the base portion can be oversized and/or elongate relative to the pin such that the conductor stab is pivotable about a plurality of axes. The socket can include a necked-down portion through which the conductor stab extends, the necked-down portion surrounding the base portion of the conductor stab and limiting movement of the conductor stab about the pin.

The connector portion mounted to the bus bar can include a fork connector, the fork connector sized to be closely received in the socket of the housing with the conductor stab extending between respective prongs of the fork connector, at least one of a leading edge of the fork connecter or the housing surrounding the socket being chamfered such that, during insertion of the fork connector into the socket when a misalignment exists, the fork connector impinges on the housing and urges the housing to shift to self-align the socket with the fork connector. The housing can have a plurality of locating ribs surrounding the socket.

In accordance with another aspect, a flexible connector portion for electrically coupling associated components of a motor drive comprises a housing mountable to an associated component of a motor drive, the housing including a socket for receiving a mating connector portion, and a conductor stab supported in the socket of the housing and configured to be received in a slot of the male connector portion, the conductor stab moveable relative to the housing.

The housing can include a necked down portion (e.g., a throat) opening to a base of the socket, the conductor stab extending through said necked down portion, the conductor stab secured to the housing with a pin mounted in said necked down portion and extending through a hole in the base portion of the conductor stab, whereby the conductor stab is pivotable and slideable about said at least one pin relative to the housing. The hole in the base portion can be oversized relative to the pin such that the conductor stab is pivotable about a plurality of axes. The necked-down portion of the socket can surround the base portion of the conductor stab and limit movement of the conductor stab about the pin. A power module including the flexible connector portion as set forth above is also disclosed.

Plastic housing contains bus bar stabs on pins. The assembly allows bars and housing to translate and rotate in multiple axis. The free movement allows bus bars to overcome tolerance stackup misalignment issues in drive assemblies to permit good electrical connection to fork connectors.

DETAILED DESCRIPTION

Figure 1:
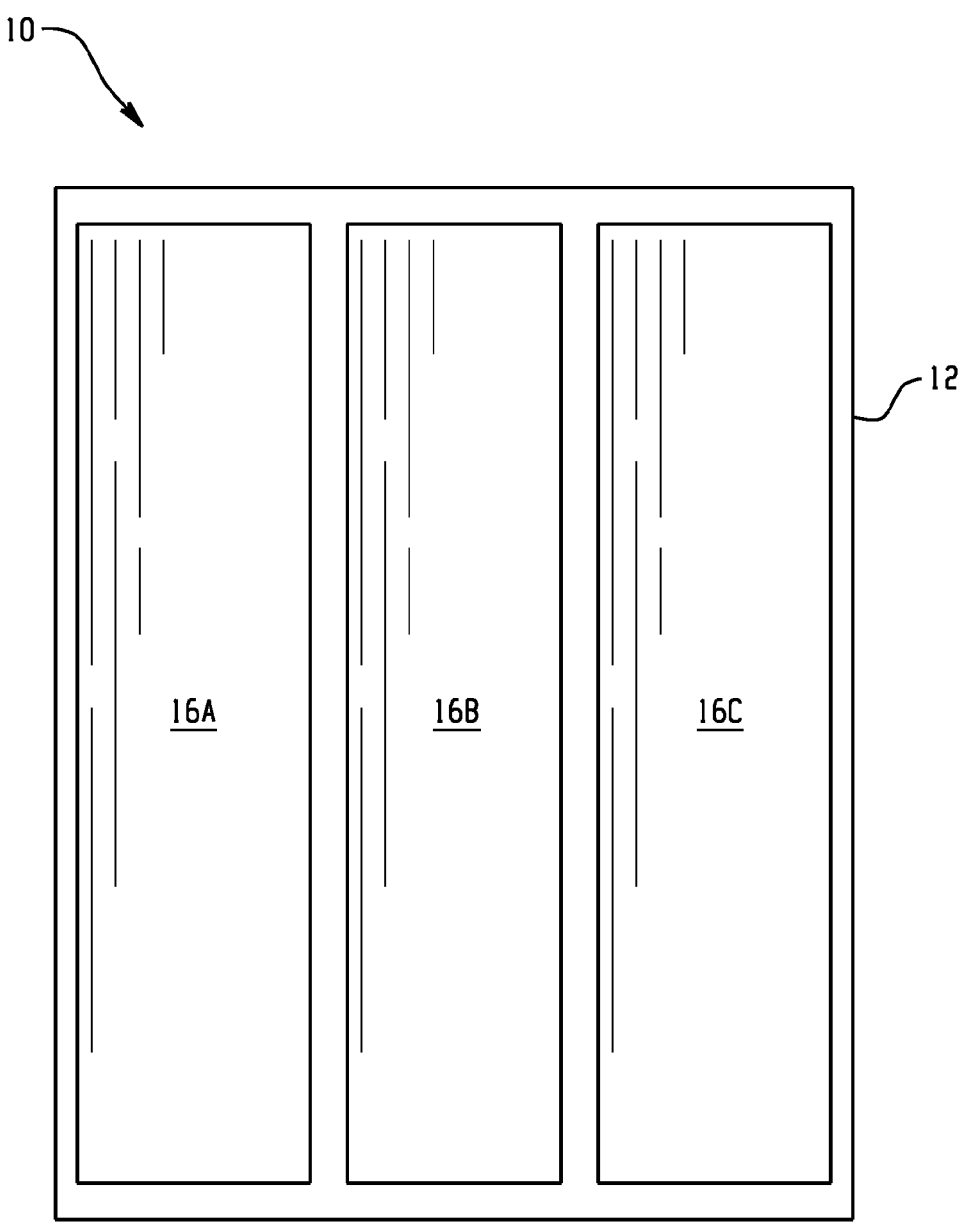
FIG. 1 is a front elevational view of an exemplary motor drive in accordance with the present disclosure.

Referring now to the drawings, and initially to FIG. 1, an exemplary motor drive is illustrated and identified generally by reference numeral 10. The motor drive 10 includes an enclosure 12 in the form of a cabinet. The cabinet contains three modular power units 16A, 16B, and 16C arranged in a row. The modular power units 16A, 16B and 16C are removable/replaceable units that can be positioned into the enclosure 12, and electrically coupled together as will be described below.

Figure 2:
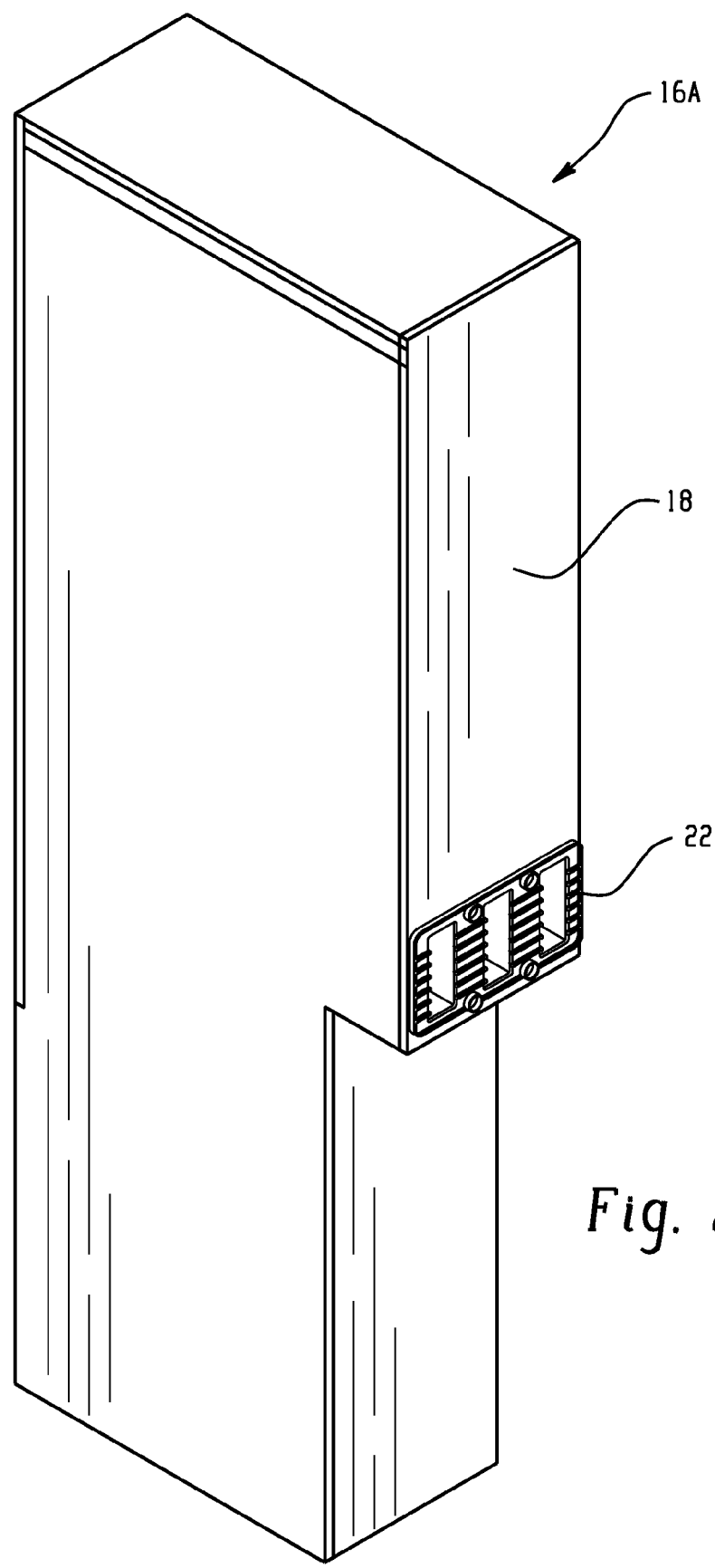
FIG. 2 is a perspective view of a modular power unit including a connector part in accordance with the present disclosure.

Turning to FIG. 2, individual modular power unit 16A is illustrated separate from the motor drive 10 and includes a cabinet 18 in which a variety of electrical components are supported. For the purposes of the present disclosure, the specific types of electrical components supported within the motor drive and/or the modular power units is not important, and aspects of the present disclosure can be used in connection with virtually any type of electrical component. It will be appreciated that each of the modular power units 16A, 16B and 16C can contain the same or different electrical components, and the units can be selected to provide a motor drive with a desired output/functionality.

A backside of the modular power unit 16A includes a connector part 22 for interconnecting the modular power unit 16A with a bus bar within the enclosure 12 of the motor drive. Modular power units 16B and 16C share a similar overall construction.

Figure 4:
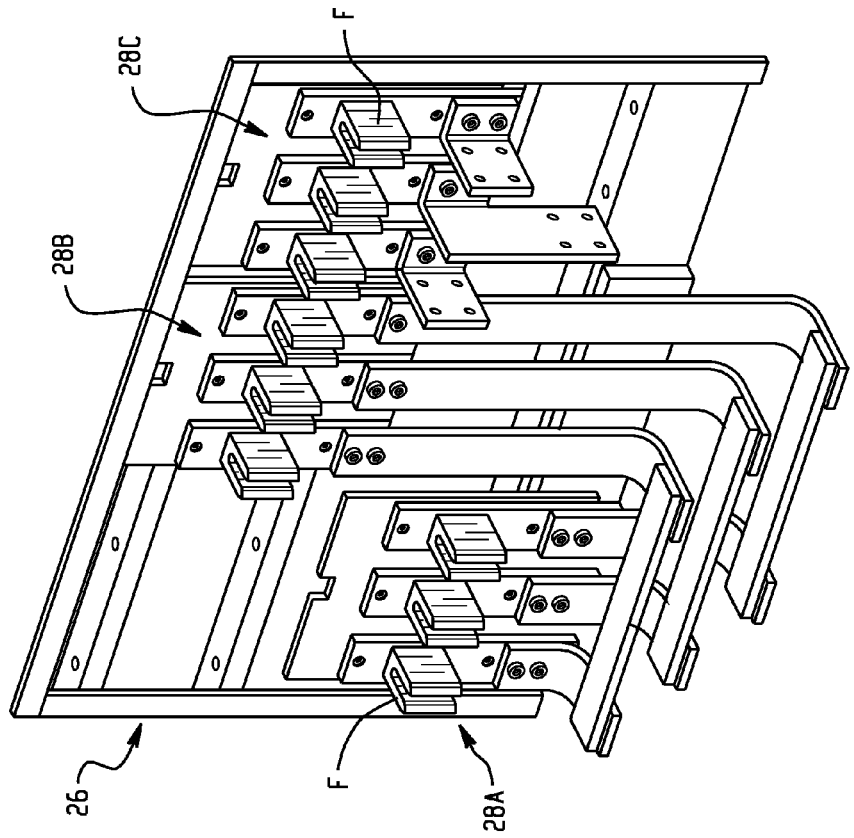
FIG. 4 is an enlarged portion of FIG. 3 illustrating a perspective view of an exemplary bus bar including power fork connectors in accordance with the present disclosure.
Figure 3:
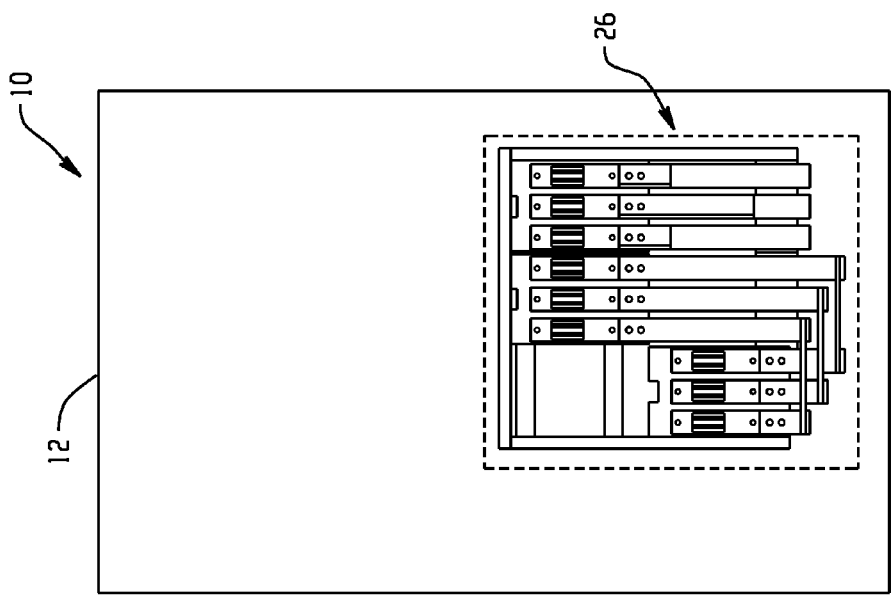
FIG. 3 is a front elevational view of the motor drive of FIG. 1 with the module power units removed therefrom.

With reference to FIGS. 3 and 4, the enclosure 12 of the motor drive unit 10 is illustrated with the modular power units 16A, 16B and 16C removed therefrom exposing a bus bar 26. The bus bar 26 is supported on an interior surface of the enclosure 12 and includes three sets of fork connectors 28A, 28B and 28C (individual for connectors labeled F) adapted to mate with respective connector portions on the back of the modular power units 16A, 16B and 16C (e.g., connector portion 22 illustrated in FIG. 2) when the modular power units are positioned within the enclosure 12.

It should be appreciated that during assembly of a motor drive unit, as each respective modular power unit is positioned into the enclosure 12, some degree of alignment between the respective sets of fork connectors 28A, 28B and 28C and the respective connector parts on the rear of the modular power unit 16A, 16B and 16C is generally needed to ensure proper mating and a robust electrical connection between the bus bar 26 and the respective modular power units 16A, 16B and 16C.

In the past, in order to ensure proper alignment, very tight manufacturing tolerances were generally employed to ensure the proper location of the respective connector parts such that the modular power units could simply be wheeled into place and properly connected to the bus bar 26. That is, significant care had to be taken to ensure the proper alignment of the mating connector parts.

Figure 5:
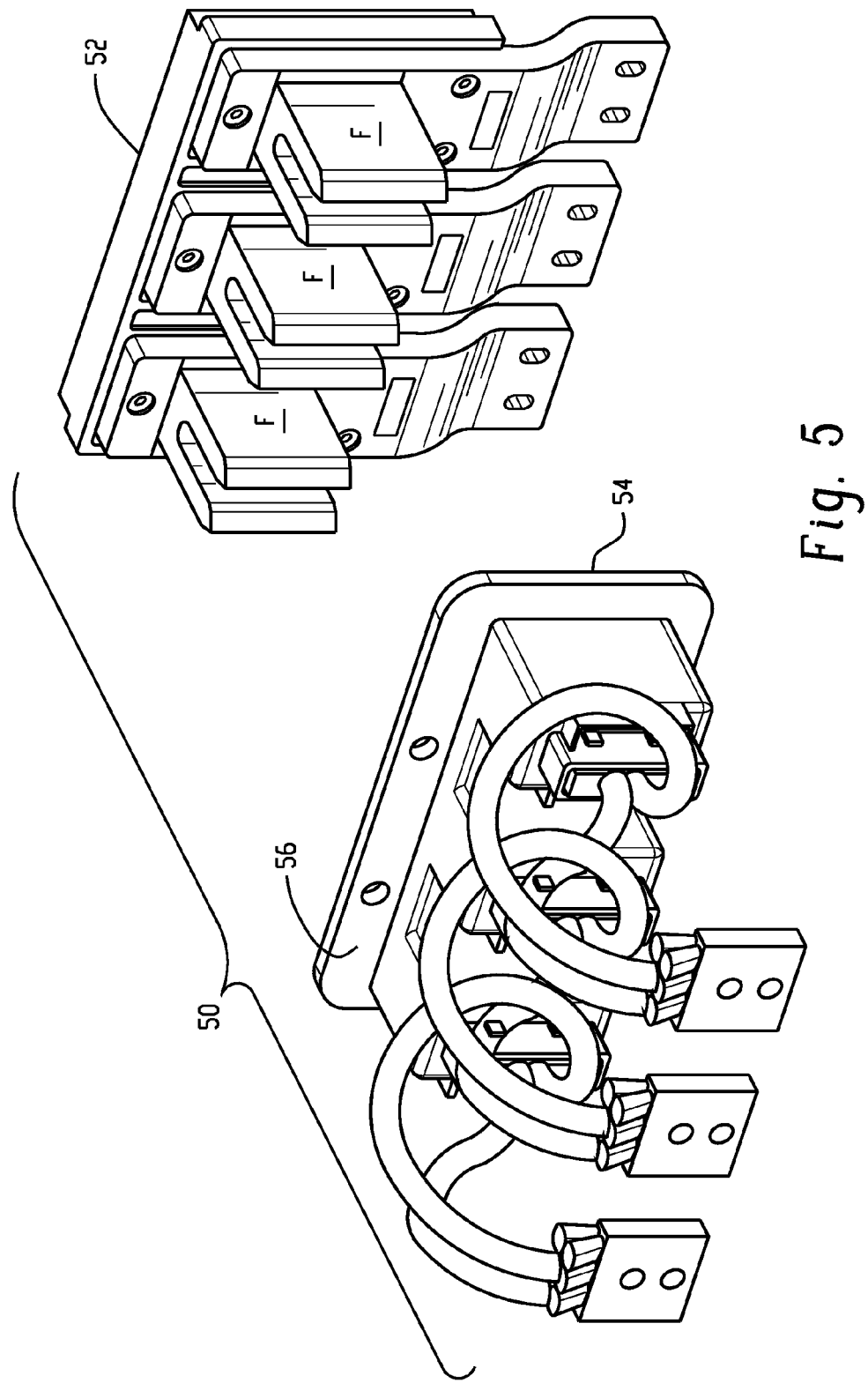
FIG. 5 is a perspective view of a flexible connector in accordance with the present disclosure.

In accordance with the present disclosure, and with reference to FIG. 5, a flexible connector is set forth that accommodates a significant range of misalignment, (both lateral and angular) between the components while still maintaining/ensuring a robust electrical connection. The flexible connector of the present disclosure is particularly well-suited for blind connections between components where inspection of the connection is generally not possible, such as between the modular power units and the bus bar of the motor drive set forth above. In addition, the exemplary connector can reduce or eliminate the strict manufacturing tolerance requirements that have been previously employed to ensure alignment of the connector components thus resulting in cost savings in the manufacturing of the motor drive unit and related components.

The exemplary flexible connector of FIG. 5 is identified generally by reference numeral 50. The flexible connector 50 includes mating male and female connector portions 52 and 54. It will be appreciated that connector portion 52 includes a set of fork connectors F, such as fork connector sets 28A, 28B or 28C shown in FIG. 4, while connector portion 54 generally corresponds to connector portion 22 provided on the back of one of the exemplary modular power unit 16A, 16B and 16B, shown in FIG. 2.

Figure 6:
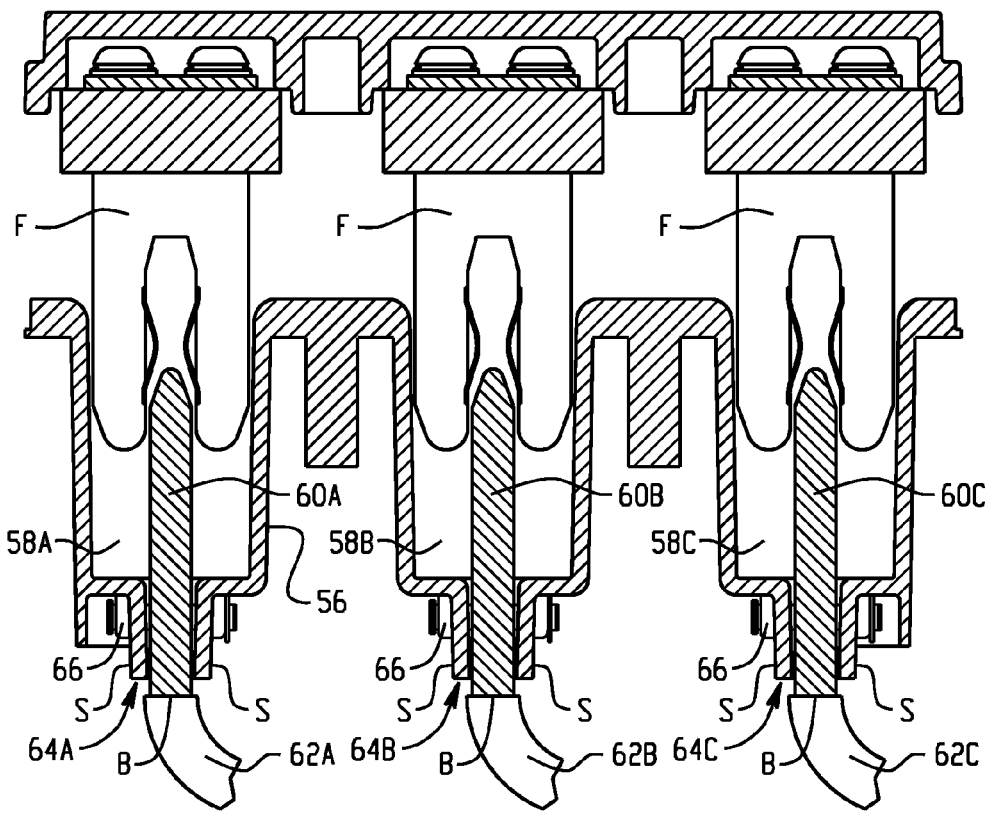
FIG. 6 is a cross-sectional view of the exemplary flexible connector in a partially engaged state.
Figure 7:
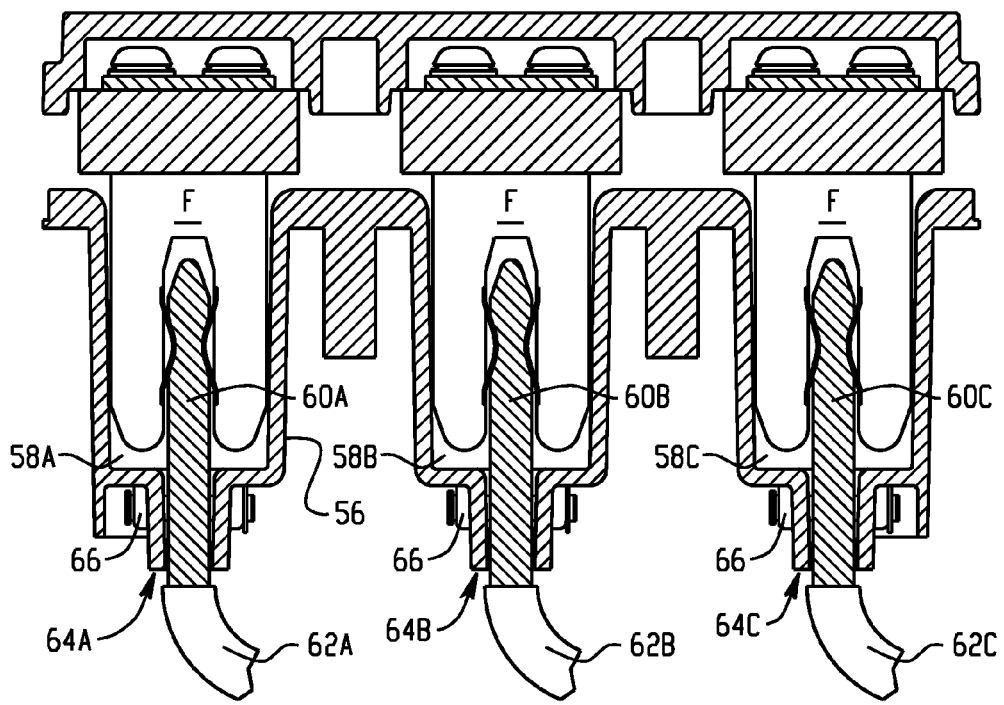
FIG. 7 is a cross-sectional view of the exemplary flexible connector in a fully engaged state.

With additional reference to FIGS. 6 and 7, connector portion 54, which in the illustrated embodiment is the female connector portion, generally includes a housing 56 that includes three sockets 58A, 58B and 58C in which respective conductor stabs 60A, 60B and 60C are supported. While the illustrated connector includes three sockets, virtually any desired number of sockets could be provided depending on a particular application. Each of the conductor stabs 60A, 60B and 60C are coupled to a flexible conductor 62A, 62B and 62C, respectively. In one embodiment, the flexible conductor 62A, 62B and 62C are formed integrally with the conductor stabs 60A, 60B and 60C.

Each of the conductor stabs 62A, 62B and 62C extend through a necked down portion 64A, 64B and 64C of the housing 56 that opens to a base of a respective socket 58A, 58B and 58C. The conductor stabs 60A, 60B, and 60C are each flexibly coupled to the housing 56 by a pair of pins 66 (pair of pins best shown in FIGS. 9 and 10). Although two pins are used to couple each conductor stab to the housing 56, it is possible to use a single pin, or more than two pins, depending on a particular application. Each pin 66 is inserted through respective sidewalls S of the necked down portion of the housing and through a respective hole 70 in a base portion B of a conductor stab. An E-clip 72 or other retaining member is installed to the end of each pin 66 to secure it in place. It will be appreciated that other types of fasteners can be used to secure the conductor stabs in place, such as bolts. In another embodiment, the stabs can be formed with pins configured to be received in respective bores in the housing.

Figure 8:
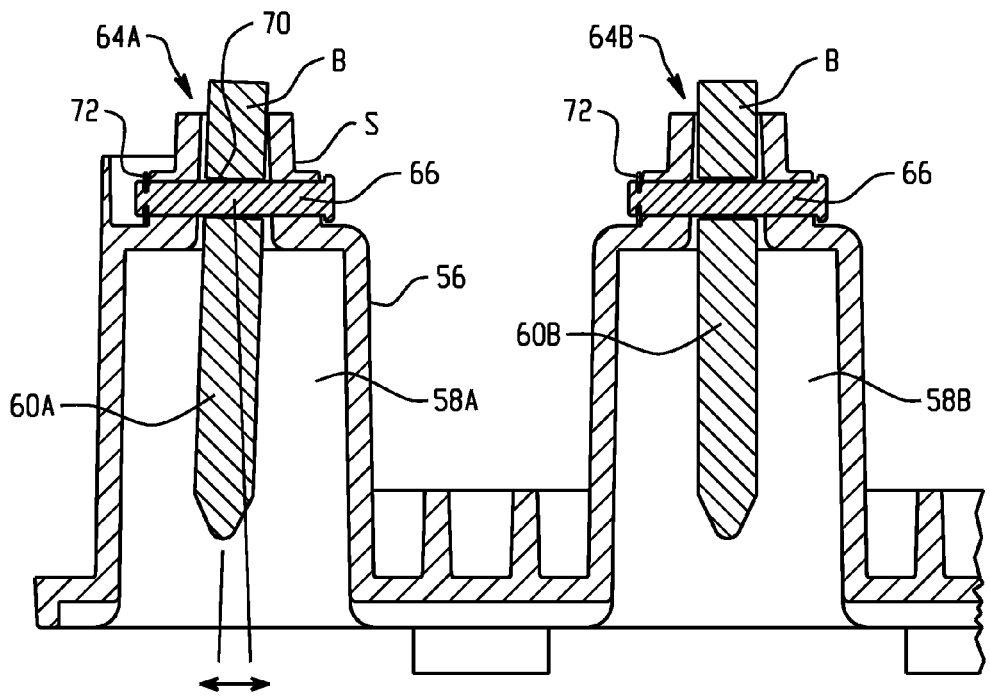
FIG. 8 is a top view illustrating a first degree of freedom of a conductor stab in accordance with the present disclosure.
Figure 9:
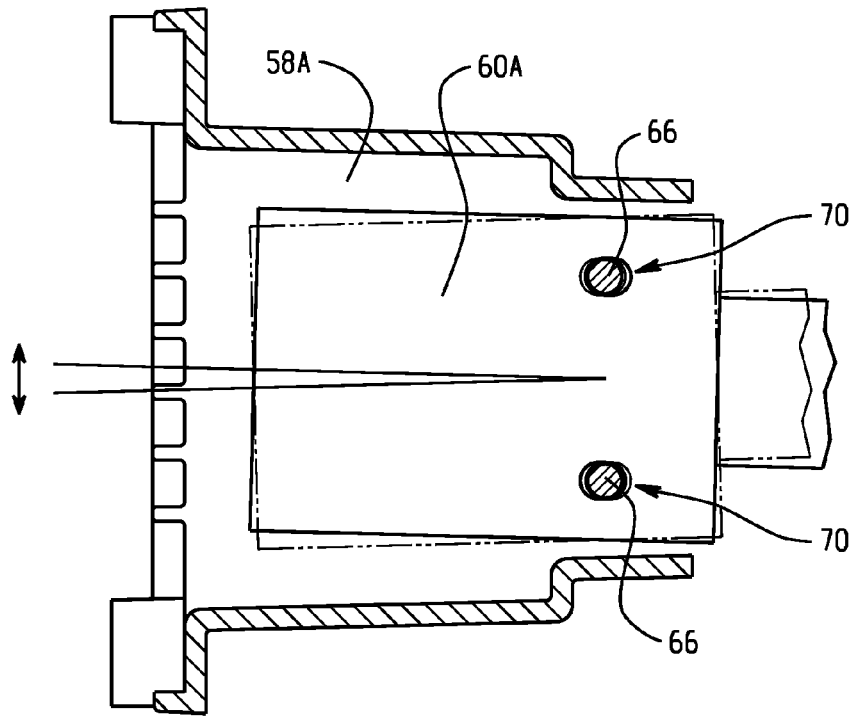
FIG. 9 is a side view illustrating a second degree of freedom of a conductor stab in accordance with the present disclosure.

Referring now to FIGS. 8 and 9, it will be appreciated that the hole 70 in each conductor stab through which each pin 66 passes is slightly oversized (approximately 10%) relative to the diameter of the pin to allow deflection and/or rotation of the conductor stab about the pin. For example, in FIG. 8, conductor stab 60A is illustrated in a deflected position as compared to the neutral position of conductor stab 60B. For a connector portion 54 installed in a modular power unit as shown in FIG. 2, the direction of this deflection is about a vertical axis. The conductor stabs can also be deflected about a horizontal axis, as shown in FIG. 9.

It should further be appreciated that the oversized holes 70 allow translation of the conductor stabs in both the vertical and horizontal directions in FIG. 9. Moreover, the oversized holes 70 allow a twisting (e.g., rotation) of the conductor stabs about a horizontal axis as used in this paragraph. It should be understood that the terms horizontal and vertical refer to the orientation of the drawing and the depiction of the connector portion 54 therein. Other orientations are possible and the relative directions and axis about which the deflection of the conductor stab occurs would be relative to such other orientations.

It will now be appreciated that each of the conductor stabs 60A, 60B and 60C float within the housing 56 such that minor misalignment between the conductor stabs 60A, 60B, and 60C and respective fork connectors F can be accommodated by movement of the conductor stabs 60A, 60B, and 60C during engagement of the connector portions. This is illustrated in FIGS. 6 and 7 where conductor stab 60C is repositioned slightly in a lateral direction as the fork connector is seated in socket 58C.

It will also be appreciated that movement of the conductor stabs 60A, 60B, and 60C can be limited at least to some extent by the necked down portion of the housing. That is, as the conductor stab is deflected, rotated, etc. the base portion thereof will eventually interfere with the necked down portion of the housing, thus limiting further movement of the conductor stab. Accordingly, clearance between the base portion of a conductor stab and the necked down portion of the housing can be designed to limit certain movements of the conductor stab. In other embodiments, the size of the holes 70 can limit certain movements/deflections of the conductor stabs, with relatively smaller oversized holes providing more limited movement than relatively larger oversized holes.

Figure 10:
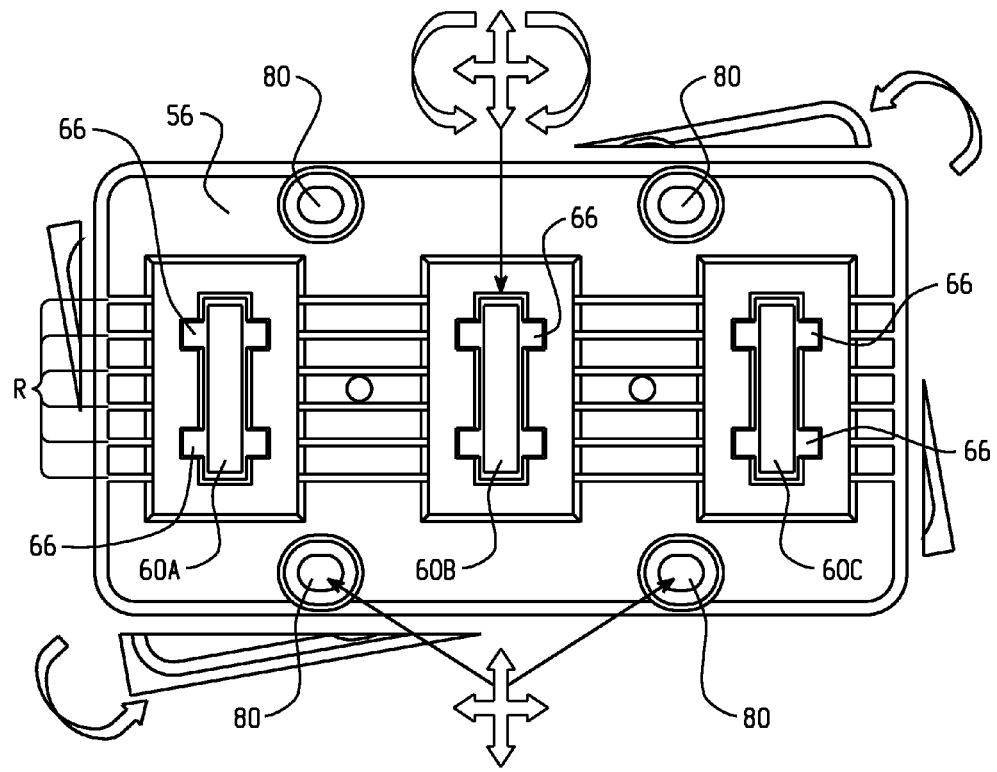
FIG. 10 is a front elevational view a housing of a connector part in accordance with the present disclosure.
Figure 11:
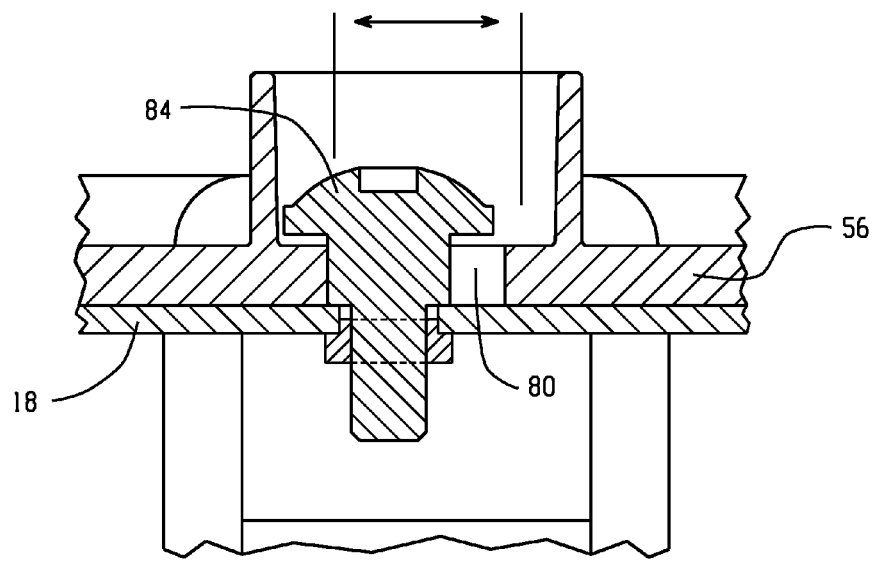
FIG. 11 is a cross-sectional view of a shoulder screw securing the housing of FIG. 10 to an electrical component.

Turning now to FIG. 10, it will further be appreciated that the housing 56 is also configured to be mounted for movement relative to the modular power unit to accommodate misalignment of the fork connectors with the sockets during mating/installation. To this end, oblong or elongate mount holes 80 permit mounting of the housing 56 to the modular power unit with shoulder screws 84 (See FIG. 11) or other suitable fasteners, whereby the housing 56 is free to translate left/right and/or up/down as shown in FIG. 10. The head of the shoulder screws 84 trap the housing 56 in place against the modular power unit, while allowing the housing 56 to translate as shown. In addition, the housing 56 can rotate to some degree as shown to accommodate angular misalignment. In other embodiments, the housing 56 can be mounted with a large, flexible gasket that permits the housing to float relative to the modular power unit. In still other embodiments, the housing can include protrusions that extend into elongate holes in the modular power unit. Tinnerman nuts or other fasteners can be used to retain the protrusions in the elongate holes.

Figure 12:
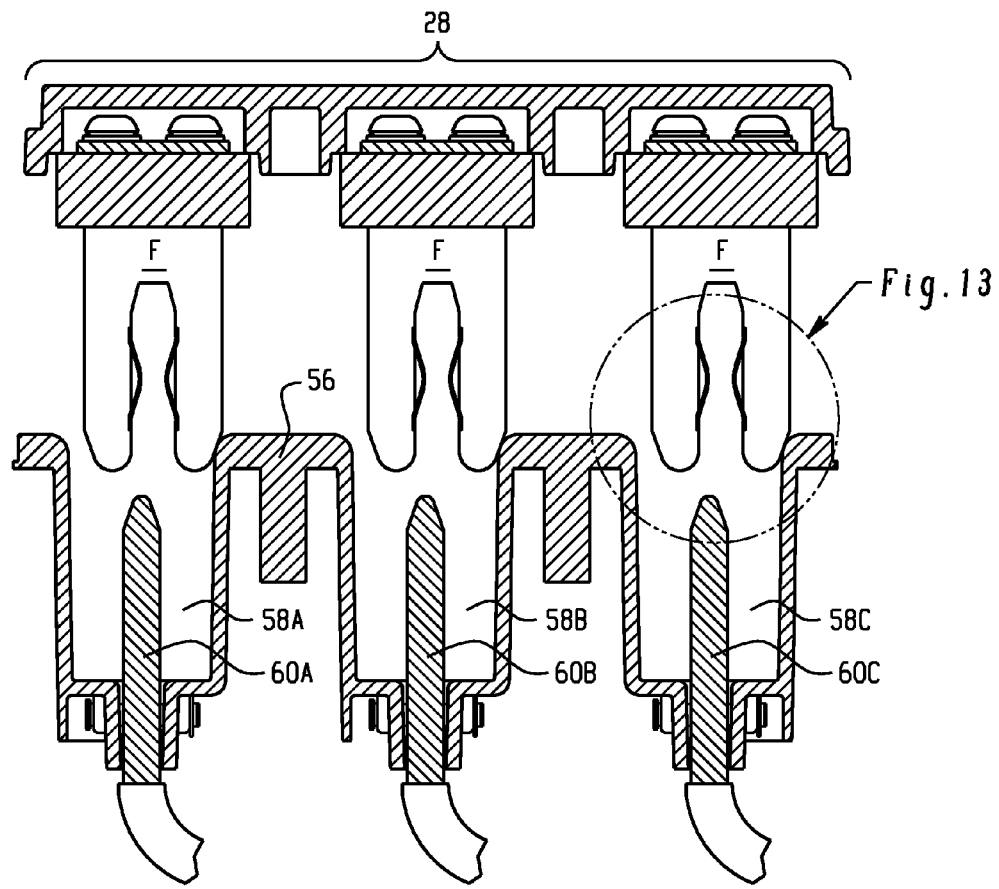
FIG. 12 is a cross-sectional view of an exemplary flexible connector illustrating an initial contact of misaligned connector portions during engagement.
Figure 13:
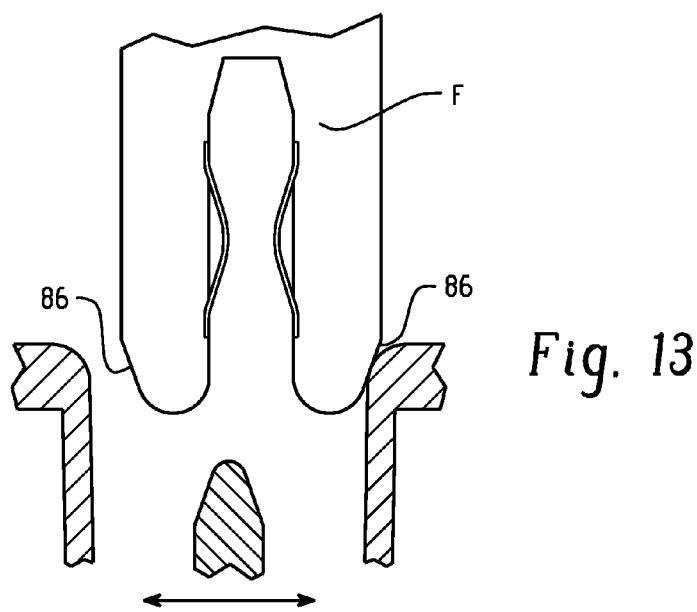
FIG. 13 is an enlarged portion of FIG. 12.

FIGS. 12 and 13, illustrate an exemplary connector in a misaligned condition wherein the fork connectors F are offset from the sockets of the housing. In such a condition, the leading edges of the fork connectors impinge on the housing and urge the housing to shift to the right in FIGS. 12 and 13 as the forks are received in the sockets. To this end, the leading edges of the connector forks include a chamfered (e.g., ramp) surface 86 configured to engage the housing 56. In addition, a plurality of ribs R (see FIG. 10) extend from the housing face adjacent the sockets to assist in guiding the forks F into the sockets.

Figure 14:
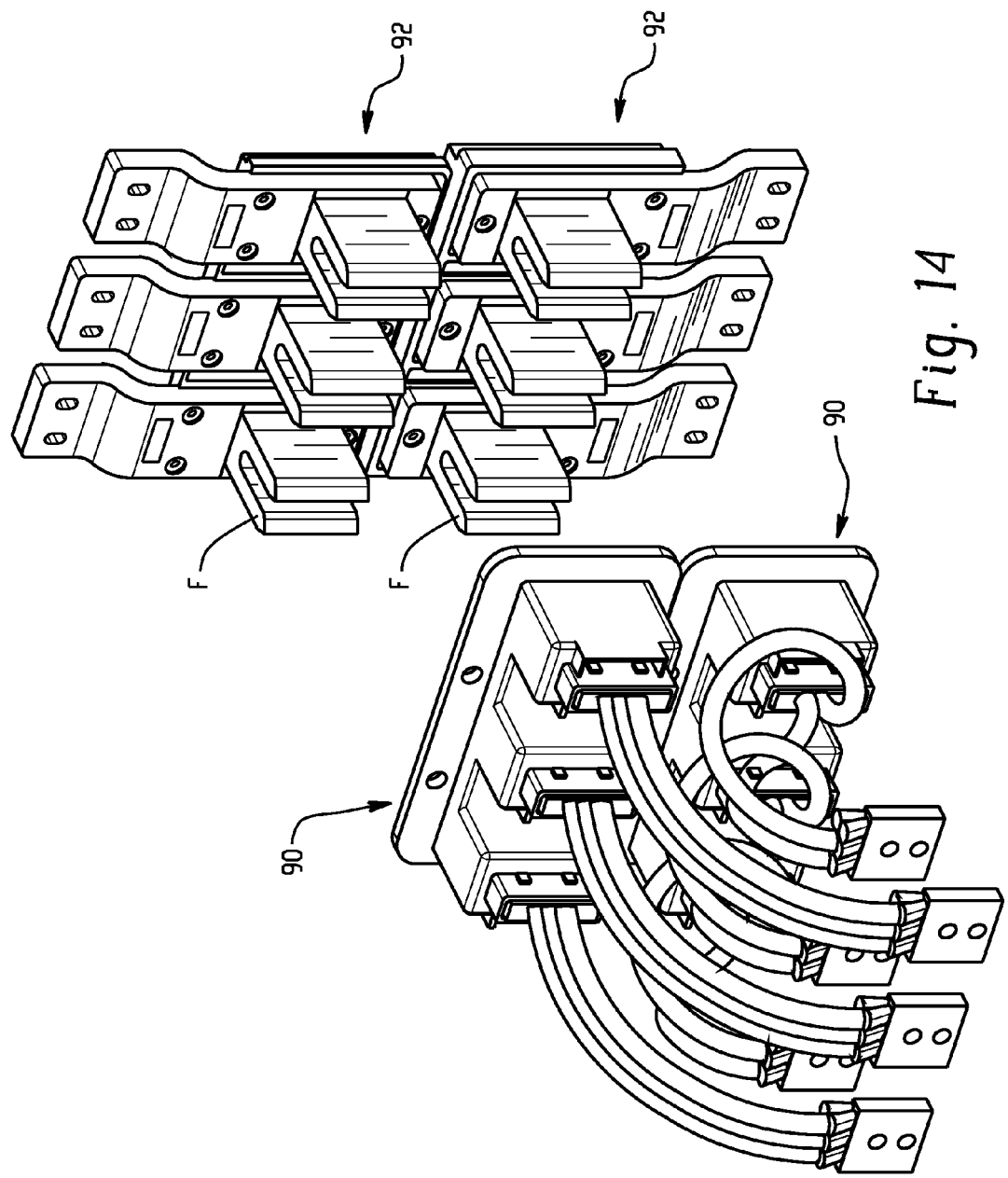
FIG. 14 is a perspective view of another exemplary flexible connector arrangement in accordance with the present disclosure.

Turning now to FIG. 14, a pair of exemplary connector portions 90 are illustrated in a stacked configuration. Connector portions 90 may be provided, for example, on the back of a modular power unit or other component for connection of the same to respective sets of fork connectors 92. The relative alignment between each connector portion 90 and its mating fork connectors 92 can be different depending on a given construction. The exemplary connectors 90 in accordance with the present disclosure can accommodate the different alignments, with each connector portion 90 self-aligning with its respective fork connectors 92 during coupling.

It will now be appreciated that the present disclosure sets forth an exemplary flexible connector that can self-align through at least two independent mechanisms: the flexible conductor stab mounts and the floating housing. Each mechanism supports flexibility in multiple degrees of freedom, and can be implemented independently or in combination to achieve a desired degree of self-alignment. The exemplary connector is well-suited for applications including blind connections such as those commonly made when installing modular power units in an enclosure of a motor drive. While the exemplary embodiments disclosed above relate to the connection of components in a motor drive unit, it will be appreciated that aspects of the present disclosure are applicable to a wide variety of electrical connections and to other applications in addition to motor drive units.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A motor drive unit comprising:
   an enclosure;
   a bus bar supported by the enclosure;
   at least one modular power unit; and
   a flexible connector for electrically coupling the modular power unit with the bus bar;
   wherein the flexible connector includes mating male and female connector portions each mounted to a respective one of the bus bar and the modular power unit, the connector portion mounted to the modular power unit being supported by a housing mounted to the modular power unit for movement relative thereto;
   whereby the housing supporting the connector portion mounted to the modular power unit is configured to at least one of translate or rotate relative to the modular power unit.

2. The motor drive unit of claim 1, wherein the housing is secured to the modular power unit with at least one fastener, said at least one fastener extending through an oversized mount hole in at least one of the housing or the modular power unit.

3. The motor drive unit of claim 2, wherein the fastener includes a shoulder screw, and wherein the mount hole is elongate.

4. The motor drive unit of claim 1, further comprising a conductor stab supported in a socket of the housing of the connector portion of the modular power unit.

5. The motor drive unit of claim 4, wherein the conductor stab is supported for movement relative to the housing.

6. A motor drive unit comprising:
an enclosure;
a bus bar supported by the enclosure;
at least one modular power unit; and
a flexible connector for electrically coupling the modular power unit with the bus bar, the flexible connector including mating male and female connector portions each mounted to a respective one of the bus bar and the modular power unit, the connector portion mounted to the modular power unit being supported by a housing mounted to the modular power unit for movement relative thereto
a conductor stab supported in a socket of the housing of the connector portion of the modular power unit;
wherein the conductor stab is supported for movement relative to the housing; and
wherein a base portion of the conductor stab is coupled to the housing by at least one pin extending through a hole in the base portion of the conductor stab, respective ends of the at least one pin being secured to the housing, whereby the conductor stab is pivotable and slideable about said at least one pin.

7. The motor drive unit of claim 6, wherein the hole in the base is oversized relative to the pin such that the conductor stab is pivotable about a plurality of axes.

8. The motor drive unit of claim 6, wherein the socket includes a necked-down portion through which the conductor stab extends, the necked-down portion surrounding the base portion of the conductor stab and limiting movement of the conductor stab about the pin.

9. The motor drive unit of claim 8, wherein clearance between the necked-down portion and the base portion of the conductor stab can be selected depending on a desired stab movement.

10. The motor drive unit of claim 6, wherein the connector portion mounted to the bus bar includes a fork connector, the fork connector sized to be closely received in the socket of the housing with the conductor stab extending between respective prongs of the fork connector, at least one of a leading edge of the fork connector or the housing surrounding the socket being chamfered such that, during insertion of the fork connector into the socket when a misalignment exists, the fork connector impinges on the housing and urges the housing and power unit to shift to self-align the socket with the fork connector.

11. The motor drive unit of claim 10, wherein the housing has a plurality of locating ribs surrounding the socket.

12. A flexible connector portion for electrically coupling associated components of a motor drive comprising:
a housing mountable to an associated component of a motor drive, the housing including a socket for receiving a mating connector portion; and
a conductor stab supported in the socket of the housing and configured to be received in a slot of a male connector portion, the conductor stab moveable relative to the housing;
wherein the housing includes a necked down portion opening to a base of the socket, the conductor stab extending through said necked down portion, the conductor stab secured to the housing with a pin mounted in said necked down portion and extending through a hole in the base portion of the conductor stab, whereby the conductor stab is pivotable and slideable about said at least one pin relative to the housing.

13. The flexible connector portion of claim 12, wherein the hole in the base portion is oversized relative to the pin such that the conductor stab is pivotable about a plurality of axes.

14. The flexible connector portion of claim 12, wherein the necked-down portion of the socket surrounds the base portion of the conductor stab and limits movement of the conductor stab about the pin.

15. The flexible connector portion of claim 14, wherein clearance between the necked-down portion and the base portion of the conductor stab can be selected depending on a desired stab movement.

16. A power module including the flexible connector portion of claim 12, wherein the housing of the flexible connector portion further comprises a plurality of elongate mount holes for mounting the housing to the power module such that the housing is movable along at least one axis.

17. The connector of claim 12, wherein the housing has a plurality of locating ribs surrounding the socket.

\* \* \* \* \*